(12) United States Patent
Lim et al.

(10) Patent No.: US 7,511,088 B2
(45) Date of Patent: Mar. 31, 2009

(54) FLAME RETARDANT THERMOPLASTIC RESIN COMPOSITION

(75) Inventors: Jong Cheol Lim, Gyeonggi-do (KR); Sam Joo Yang, Gyeonggi-do (KR)

(73) Assignee: Cheil Industries Inc., Kyungsangbuk-do (KR)

( * ) Notice: Subject to any disclaimer, the term of this patent is extended or adjusted under 35 U.S.C. 154(b) by 421 days.

(21) Appl. No.: 10/520,842

(22) PCT Filed: Sep. 30, 2002

(86) PCT No.: PCT/KR02/01832

§ 371 (c)(1), (2), (4) Date: Jan. 10, 2005

(87) PCT Pub. No.: WO2004/007611

PCT Pub. Date: Jan. 22, 2004

(65) Prior Publication Data

US 2005/0245648 A1    Nov. 3, 2005

(30) Foreign Application Priority Data

Jul. 11, 2002  (KR) .................... 10-2002-0040373

(51) Int. Cl.
*C08K 5/5399* (2006.01)
*C08K 5/523* (2006.01)

(52) U.S. Cl. ...................... 524/122; 524/127

(58) Field of Classification Search .......... 524/122, 524/127

See application file for complete search history.

(56) References Cited

U.S. PATENT DOCUMENTS

| | | |
|---|---|---|
| 4,391,935 A | 7/1983 | Bialous et al. |
| 4,692,488 A | 9/1987 | Kress et al. |
| 5,061,745 A | 10/1991 | Wittmann et al. |
| 5,204,394 A | 4/1993 | Gosens et al. |
| 5,206,404 A | 4/1993 | Gunkel et al. |
| 5,672,645 A | 9/1997 | Eckel et al. |
| 6,630,524 B1 * | 10/2003 | Lim et al. .................... 524/100 |
| 6,914,089 B2 * | 7/2005 | Eckel et al. ................. 524/115 |

FOREIGN PATENT DOCUMENTS

| | | |
|---|---|---|
| DE | 10061081 * | 6/2002 |
| EP | 0 728 811 A2 | 8/1996 |
| EP | 0 970 997 A2 | 1/2000 |
| EP | 1 069 156 A1 | 1/2001 |
| JP | 59-202240 | 11/1984 |
| JP | 06-100785 | 4/1994 |
| KR | 1999-47019 | 7/1999 |
| KR | 2002-83711 | 11/2002 |
| KR | 2001-107423 | 12/2002 |
| WO | WO 99/19383 | 4/1999 |
| WO | WO 00/09518 | 2/2000 |
| WO | WO 02 46287 | 6/2002 |

OTHER PUBLICATIONS

Abstract of Japan Patent Application Laid-open No. 59-202,240, Nov. 16, 1984.
Abstract of Japan Patent Application Laid-open No. 06-100785, Apr. 12, 1994.
Abstract of Korean Patent Application Laid-open No. 2002-83711, Nov. 4, 2002.
Abstract of Korean Patent Application Laid-open No. 2001-107423, Dec. 7, 2002.
Abstract of Korean Patent Application Laid-open No. 1999-47019, Jul. 5, 1999.
Abstract of WIPO Publication No. WO 00/09518, Feb. 24, 2000.
Abstract of WIPO Publication No. WO 99/19383, Apr. 22, 1999.

* cited by examiner

*Primary Examiner*—Peter Szekely
(74) *Attorney, Agent, or Firm*—Maria Parrish Tungol

(57) ABSTRACT

The flame retardant thermoplastic resin composition of the present invention comprises (A) 45~95 parts by weight of a polycarbonate resin; (B) 1~50 parts by weight of a rubber modified vinyl graft copolymer; (C) 0~50 parts by weight of a vinyl copolymer; (D) 1~30 parts by weight of a mixture of organic phosphorous compounds consisting of ($d_1$) 1~50% by weight of a oligomeric compound of cyclic phosphazene and ($d_2$) 99~50% by weight of an oligomeric phosphoric acid ester compound, per 100 parts by weight of the sum of (A), (B) and (C); and (E) 0.05~5 parts by weight of a fluorinated polyolefin resin per 100 parts by weight of the sum of (A), (B) and (C).

7 Claims, No Drawings

FLAME RETARDANT THERMOPLASTIC RESIN COMPOSITION

FIELD OF THE INVENTION

The present invention relates to a flame retardant thermoplastic resin composition with good flame retardancy, heat resistance and mechanical strength. More particularly, the present invention relates to a flame retardant thermoplastic resin composition having good flame retardancy, mechanical strength, heat resistance, impact resistance, thermal stability, processability, and appearance, which comprises a polycarbonate resin, a rubber modified vinyl graft copolymer, a vinyl copolymer, a cyclic oligomeric phosphazene compound, an oligomeric phosphoric acid ester compound, and a fluorinated polyolefin resin.

BACKGROUND OF THE INVENTION

A blend of a polycarbonate resin and a styrene-containing copolymer is a well-known resin composition with improved processability maintaining the good notched impact strength. This blend resin composition should further have good flame retardancy as well as high mechanical strength because the resin composition are applied to electric or electronic goods, automobile parts, office supplies, etc. To provide the polycarbonate resin with good flame retardancy, a halogen-containing flame retardant and/or an antimony-containing compound were used.

However, the halogen-containing compound is fatally harmful due to the toxic gases generated during combustion, and therefore nowadays the halogen-free resin compositions are used widely.

As a method for conferring flame-retardancy without using a halogen-based flame retardant, a method using a phosphate ester-based flame retardant is commonly used.

U.S. Pat. Nos. 4,692,488 and 5,061,745 disclose a thermoplastic resin composition comprising aromatic polycarbonate, acrylonitrile-butadiene-styrene graft copolymer, thermoplastic copolymer and monomeric phosphoric acid ester compound as flame retardant. However, the resin composition using the monomeric phosphoric acid ester compound as a flame retardant has very poor heat resistance and shows, so called, "juicing phenomenon" which occurs during molding process because the flame retardant form the laminate on the surface of molding product due to the volatility.

As a method for overcoming the juicing problems, the method increasing the molecular weight of phosphoric acid ester is commonly used. And, as a method for increasing the molecular weight of phosphoric acid ester, the introduction of substitute group to a monomeric phosphoric acid ester compound or the use of an oligomeric phosphoric ester compound is proposed.

U.S. Pat. No. 5,206,404 discloses a composition having stability against acid and hydrolysis by use of alkyl substituted aryl phosphoric ester compound. Further, Japanese Patent Application Laid Open No. 59-202,240 discloses a process of preparing oligomeric phosphoric ester compound and describes that such compounds can be used as a flame retardant in polyamide or polycarbonate.

In addition, U.S. Pat. No. 5,204,394 also discloses a flame retardant resin composition comprising an aromatic polycarbonate resin, a styrene-containing copolymer or a graft copolymer, and oligomeric phosphate as flame retardant. Although the resin composition improves the juicing phenomenon and heat resistance, but is inferior to the resin composition using the monophosphorous esters as flame retardant in flame retardancy. Accordingly, to maintain good flame retardancy, the resin composition should contain more flame retardant than in the resin composition containing the monophosphorous esters as flame retardant.

U.S. Pat. No. 5,672,645 describes a PC/ABS resin composition containing an aromatic polycarbonate, a vinyl copolymer, a graft copolymer, a combination of a monophosphate ester and an oligomeric phosphate ester as flame retardants, and a fluorinated polyolefin. In this case, the resin composition has improved stress cracking resistance, but still shows juicing phenomenon due to the monophosphorous compound. And the flame retardation ability of the resin composition is lowered due to the oligomeric phosphate ester.

Japanese Patent Laid-open No. 6-100,785 discloses a flame retardant resin composition which comprises a thermoplastic resin, a phosphate compound, and a silicon resin or a polyphosphazene to prevent from dripping of the resin during combustion. However, the Japanese patent application does not disclose that the flame retardancy of the resin composition had been improved.

EP 0 728 811 A2 discloses a thermoplastic resin composition comprising an aromatic polycarbonate, a graft copolymer, a copolymer and a phosphazene. The European patent teaches that no dripping occurs during combustion by using a phosphazene as a flame retardant even though an additional anti-dripping agent is not employed, and that the resin composition has excellent heat resistance and impact strength. However, the resin composition of the European patent has a poor processability due to the poor flowability by using the phosphazene, and causes black stripes and/or black lines on the surface of the molded article due to degradation of the resin or flame retardants when an excess stress is applied to the article during molding. In the European patent using phosphazene as a flame retardant, mechanical strength such as flexural strength and flexural modulus becomes deteriorated, and flame retardancy of the resin composition is lower than that of the resin composition using a phosphate ester as a flame retardant.

WO 00/09518 and WO 99/19383 disclose methods of preparing a cross-linked linear or cyclic phenoxy phosphazene and a thermoplastic resin composition using such phosphazene compounds. According to the patent applications, the cross-linked phenoxy phosphazene does not deteriorate the mechanical properties of the resin composition when applied, because the phosphazene has a high melting point and lower volatility. However, the resin composition of the patent applications has a poor processability due to the poor flowability by using the phosphazene, and causes black stripes and/or black lines on the surface of the molded article due to degradation of the resin or flame retardants when an excess stress is applied to the article during molding. In the patent applications using phosphazene as a flame retardant, mechanical strength such as flexural strength and flexural modulus becomes deteriorated.

The present inventors have developed a flame retardant thermoplastic resin composition that comprises a polycarbonate resin, a rubber modified vinyl graft copolymer, a vinyl copolymer, a cyclic oligomeric phosphazene compound and an oligomeric phosphoric acid ester as a flame retardant and a fluorinated polyolefin resin, which has a good balance of physical properties such as flame retardancy, impact strength, heat resistance, thermal stability, processability and appearance.

OBJECTS OF THE INVENTION

An object of the present invention is to provide a thermoplastic resin composition with good flame retardancy.

Another object of the present invention is to provide a thermoplastic flame resin composition with excellent balance of properties such as mechanical properties, heat resistance, impact strength, thermal stability, processability and appearance.

Other objects and advantages of this invention will be apparent from the ensuing disclosure and appended claims.

SUMMARY OF THE INVENTION

The flame retardant thermoplastic resin composition of the present invention comprises (A) 45~95 parts by weight of a polycarbonate resin; (B) 1~50 parts by weight of a rubber modified vinyl graft copolymer; (C) 0~50 parts by weight of a vinyl copolymer; (D) 1~30 parts by weight of a mixture of organic phosphorous compounds consisting of ($d_1$) 1~50% by weight of a oligomeric compound of cyclic phosphazene and ($d_2$) 99~50% by weight of an oligomeric phosphoric acid ester compound, per 100 parts by weight of the sum of (A), (B) and (C); and (E) 0.05~5 parts by weight of a fluorinated polyolefin resin per 100 parts by weight of weight of the sum of (A), (B) and (C).

DETAILED DESCRIPTION OF THE INVENTION (A) Polycarbonate Resin

The polycarbonate resin is prepared by reacting a diphenol represented by the following formula (I) with a phosgene, a halogen formate or a carboxylic acid diester:

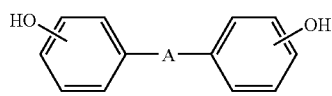

wherein A is a single bond, a $C_{1-5}$ alkylene group, a $C_{1-5}$ alkylidene group, a $C_{5-6}$ cycloalkylidene group, S or $SO_2$.

The examples of the diphenol include 4,4'-dihydroxydiphenol, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane. More preferable diphenols are 2,2-bis-(4-hydroxyphenyl)-propane, 2,2-bis-(3,5-dichloro-4-hydroxyphenyl)-propane, and 1,1-bis-(4-hydroxyphenyl)-cyclohexane, and most preferable diphenol is 2,2-bis-(4-hydroxyphenyl)-propane called 'bisphenol A'.

In the present invention, it is preferable that the polycarbonate resin (A) has a weight average molecular weight ($M_w$) of about 10,000 to 200,000, more preferably about 15,000 to 80,000.

Suitable polycarbonates incorporated into the composition of the present invention may be branched in a known manner, in particular preferably by incorporation 0.05 to 2 mol %, based to total quantity of diphenols used, of tri- or higher functional compounds, for example, those with three or more phenolic groups.

A homopolymer of polycarbonate, a copolymer of polycarbonate or a mixture thereof may be used in this invention. Some portion of the polycarbonate resin may be replaced with an aromatic polyester-carbonate resin that is obtained by polymerization in the presence of an ester precursor, such as difunctional carboxylic acid.

In the present invention, the polycarbonate resin is used in an amount of about 45 to 95 parts by weight as a base resin.

(B) Rubber Modified Vinyl Graft Copolymer

The rubber modified vinyl graft copolymer according to the present invention is prepared by graft copolymerizing ($b_1$) 5 to 95% by weight of a monomer mixture of 50 to 95% by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and 5 to 50 parts by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture there of onto ($b_2$) 5 to 95% by weight of a rubber polymer selected from the group consisting of butadiene rubber, acryl rubber, ethylene-propylene rubber, styrene-butadiene rubber, acrylonitrile-butadiene rubber, rubber, isoprene rubber, copolymer of ethylene-propylene-diene (EPDM), polyorganosiloxane-polyalkyl (meth)acrylate rubber complex and a mixture thereof.

The $C_{1-8}$ methacrylic acid alkyl ester or the $C_{1-8}$ acrylic alkyl ester is ester of methacrylic acid or acrylic acid respectively with monohydric alcohol with 1 to 8 carbon atoms. The examples of the acid alkyl ester include methacrylic acid methyl ester, methacrylic acid ethyl ester, acrylic acid ethyl ester, acrylic acid methyl ester, or methacrylic acid propyl ester.

Preferable examples of the rubber modified vinyl graft copolymer (B) are grafted-copolymers obtained by graft polymerizing a mixture of styrene, acrylonitrile, and optionally (meth)acrylic acid alkyl ester onto butadiene rubber, acryl rubber, or styrene-butadiene rubber.

Another preferable examples of the rubber modified vinyl graft copolymer (B) are grafted-copolymers obtained by graft polymerizing (meth)acrylic acid alkyl ester onto butadiene rubber, acryl rubber, or styrene-butadiene rubber.

The most preferable example of the rubber modified vinyl graft copolymer (B) is an acrylonitrile-butadiene-styrene (ABS) resin.

The rubber polymer to prepare the rubber modified vinyl graft copolymer has preferably an average particle size of about 0.05 to 4.0 µm considering the impact strength and appearance.

The rubber modified graft copolymer according to the present invention can be prepared through a conventional polymerization process such as emulsion, suspension, solution, or bulk process. Among these processes, preferable is the emulsion or bulk polymerization in which said vinyl monomers are added to the rubber polymer using an initiator.

The rubber modified vinyl graft copolymer is used in an amount of about 1 to 50 parts by weight.

(C) Vinyl Copolymer

The vinyl copolymer of the present invention is a vinyl copolymer or a mixture of thereof that is prepared from ($c_1$) 40 to 95% by weight of styrene, α-methystyrene, halogen- or alkyl-substituted styrene, $C_{1-8}$ methacrylic acid alkyl ester, $C_{1-8}$ acrylic acid alkyl ester, or a mixture thereof and ($c_2$) 5 to 60% by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture thereof.

The $C_{1-8}$ methacrylic acid alkyl ester or $C_{1-8}$ acrylic acid alkyl ester is ester of methacrylic acid or acrylic acid respectively with monohydric alcohol with 1 to 8 carbon atoms. The examples of the acid alkyl ester include methacrylic acid methyl ester, methacrylic acid ethyl ester, acrylic acid ethyl ester, acrylic acid methyl ester, or methacrylic acid propyl ester.

The vinyl copolymer (C) can be produced as by-products when preparing the rubber modified vinyl-grafted copolymer (B). The by-products are mostly produced when a large quantity of monomers are grafted onto a small amount of rubber polymer or when a chain transfer agent is used in excess. The amount of the vinyl copolymer (C) to be used in this invention does not include the amount of the by-products that might be produced during preparation of the rubber modified vinyl-grafted copolymer (B).

The preferable examples of the vinyl copolymer (C) are those prepared from monomer mixture of styrene, acrylonitrile, and optionally methacrylic acid methyl ester; monomer mixture of α-methyl styrene, acrylonitrile, and optionally methacrylic acid methyl ester; or monomer mixture of styrene, α-methyl styrene acrylonitrile, and optionally methacrylic acid methyl ester.

The vinyl copolymer is preferably prepared by emulsion, suspension, solution, or bulk process, and has a preferable weight average molecular weight ($M_w$) of about 15,000 to 400,000.

Another preferable examples of the vinyl copolymer (C) are those prepared from a mixture of methacrylic acid methyl ester monomers and optionally acrylic acid methyl ester monomers or acrylic acid ethyl ester monomers. The methacrylic acid methyl ester copolymer (C) of the present invention is preferably prepared by emulsion, suspension, solution or bulk process, and has a weight average molecular weight ($M_w$) of about 20,000 to 250,000.

Another preferred copolymers (C) to be incorporated into the composition of the invention are random copolymers styrene and maleic acid anhydride, which is prepared by a continuous bulk process and a solution process. The maleic acid anhydride is preferably used in the amount of about 5 to 60% by weight. The copolymer of styrene and maleic acid anhydride has a weight average molecular weight ($M_w$) of about 20,000 to 200,000 and an intrinsic viscosity of about 0.3 to 0.9.

The styrene for preparation of the component (C) in this invention can be replaced by p-methylstyrene, vinyltoluene, 2,4-dimethylstyrene, or α-methylstyrene.

The vinyl copolymer (C) is used in single or in combination as a mixture and used in an amount of about 0 to 50 parts by weight.

(D) Organic Phosphorus Compound

The organic phosphorus compound of the present invention is a mixture of ($d_1$) about 1 to 50% by weight of a cyclic oligomeric phosphazene compound and ($d_2$) about 99 to 50% by weight of an oligomeric phosphate ester.

($d_1$) Cyclic Oligomeric Phosphazene Compound

The cyclic oligomeric phosphazene compound according to the present invention is an oligomer type compound or their mixture of the cyclic phosphazene linked with a linking group having a $R_2$ group, which is represented as following Formula (II):

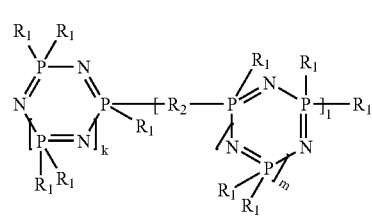

wherein $R_1$ is alkyl, aryl, alkyl substituted aryl, aralkyl, alkoxy, aryloxy, amino, or hydroxyl; k and m are an integer from 0 to 10; $R_2$ is $C_{6-30}$ dioxyaryl or alkyl substituted $C_{6-30}$ dioxyaryl derivative; and l is a degree of polymerization and the average value of l is from 0.3 to 3. The alkoxy or the aryloxy can be substituted with alkyl, aryl, amino, or hydroxy group.

For example, an oligomeric cyclic phosphazene with a number average degree of polymerization of l in Formula (II) is obtained, when cyclic phosphazenes of (l+1) monomers are linked.

It is preferable that the mixture of cyclic phosphazene oligomer has a number average degree of polymerization l of 0.3 to 3. In the present invention, cyclic phosphazene oligomers having l value of 0 to 10 may be used in single or in combination as a mixture. The cyclic phosphazene oligomers may be mixed before or after polymerizaion. The cycic phosphazene oligomers may have a branched chain.

In Formula (II), the preferable groups of $R_1$ are alkoxy and aryloxy, and the more preferable groups of $R_1$ is phenoxy.

The preferable groups of $R_2$ are a derivative from catechol, resorcinol, hydroquinone, or the bisphenylenediol of the following Formula (III):

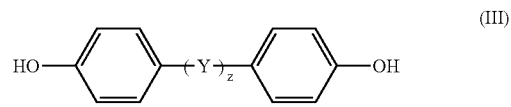

wherein Y is alkylene of $C_{1-5}$, alkylidene of $C_{1-5}$, cycloalkylidene of $C_{5-6}$, S or $SO_2$, and z is 0 or 1.

The cyclic oligomeric phosphazene of the present invention can be prepared through a conventional method that is not limited. The following method for preparation can be appropriately adopted.

Alkali metal alkylate or alkali metal arylate was prepared by the reaction of alkyl alcohol or aryl alcohol with alkali metal hydroxide such as sodium hydroxide and lithium hydroxide. In the same manner, diol with $R_2$ group was reacted with alkali metal hydroxide to prepare alkali metal diarylate. Cyclic dichlorophosphazene was reacted with a mixture of the alkali metal alkylate or alkali metal arylate and the alkali metal diarylate, and the resulting solution was further reacted with the alkali metal alkylate or alkali metal arylate to obtain the cyclic oligomeric phosphazene according to the present invention.

($d_2$) Oligomeric Phosphorus Acid Ester

The oligomeric phosphoric acid ester compound according to the present invention is represented by the following Formula (IV). The oligomeric phosphoric acid ester compound may be used in single or in combination as a mixture.

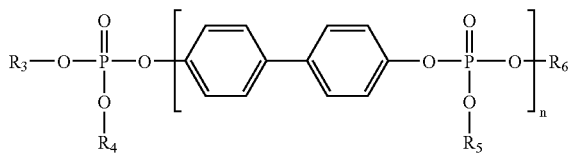

(IV)

wherein $R_3$, $R_4$, $R_5$ and $R_6$ are independently a $C_{6-20}$ aryl group or an alkyl-substituted $C_{6-20}$ aryl group, respectively, and n is an integer representing the number of repeating units of 1 to 5. The average value of n in the oligomeric phosphoric acid ester is 1 to 3.

$R_3$, $R_4$, $R_5$ and $R_6$ are preferably a phenyl group, a naphthalene group, an alkyl-substituted phenyl group or an alkyl-substituted naphthalene group in which alkyl is methyl, ethyl, propyl, isopropyl, butyl, sec- butyl, t-butyl, isobutyl, isoamyl or t-amyl, more preferably phenyl group, naphthalene group or alkyl-substituted phenyl group in which alkyl is methyl, ethyl, isopropyl or t-butyl.

The oligomeric phosphoric acid ester compound ($d_2$) according to the present invention is derived from a biphenol. In the present invention, it is to use an oligomer type phosphoric acid ester that is derived from the biphenol and has an average value of n of 1 to 3. The oligomeric phosphate having n value of 1, 2, and 3 can be used alone or a mixture thereof, which is prepared in the course of polymerization, or which is formulated with independent phosphates having the different n values.

The phosphorous compound (D) of the present invention is used in an amount of 1 to 30 parts by weight.

(E) Fluorinated Polyolefin Resin

The examples of the fluorinated polyolefin resin of the present invention are polytetrafluoroethylene, polyvinylidenefluoride, tetrafluoroethylene/vinylidenefluoride copolymer, tetrafluoroethylene/hexafluoropropylene copolymer, and ethylene/tetrafluoroethylene copolymer. The fluorinated polyolefin resin may be used in single or in combination as a mixture.

The fluorinated polyolefin resin (E) according to the present invention is prepared by a conventional process, for example, the resin is prepared in an aqueous solvent at 7 to 71 kg/cm² and 0 to 200° C., preferably 20~100° C., in the presence of a free radical forming catalyst such as sodium-, potassium-, or ammonium-peroxydisulphate.

The fluorinated polyolefin resin is used in emulsion state or in powder state. In case using in emulsion state, dispersion of the fluorinated polyolefin resin is good, but the process will be somewhat complicated. Accordingly, if the fluorinated polyolefin resin could be uniformly dispersed in the entire resin composition to form the fibrillar network structure, it is preferable to use the fluorinated polyolefin resin in powder state.

The fluorinated polyolefin resin has preferably average particle size of about 0.05 to 1,000 μm and density of about 1.2 to 2.3 g/cm³.

The fluorinated polyolefin resin is used in an amount of about 0.05 to 5.0 parts by weight as per 100 parts by weight of (A)+(B)+(C) of the flame retardant thermoplastic resin composition according to the present invention.

The flame retardant resin composition of the present invention may further contain conventional flame retardant such as an organic phosphoric acid ester, a halogen-containing organic compound, a cyanurate compound, a metal salt, and etc. The examples of the organic phosphoric acid ester are triphenyl phosphate, diphenylnaphthalene phosphate, trixylene phosphate and so on.

The metal salt such as sulfonic acid metal salt and sulfon sulfonic acid metal salt may be used as a flame retardant aid. The metal salt may be used in single or in combination as a mixture.

Other additives may be contained in the resin composition of the present invention. The additives include lubricants, releasing agents, nuclear agents, antistatic agents, stabilizers, impact modifiers, inorganic pigments or dyes and the likes. The additives are employed in an amount of 0 to 60 parts by weight as per 100 parts by weight of (A)+(B)+(C) of the flame retardant thermoplastic resin composition, preferably 0.1 to 40 parts by weight.

The flame retardant thermoplastic resin composition according to the present invention can be prepared by a conventional method. AU the components and additives are mixed together and extruded through an extruder and are prepared in the form of pellets.

The flame retardant thermoplastic resin composition according to the present invention can be applied to electric or electronic goods, automobile parts, office supplies, etc which require good flame retardancy, weld-line strength and impact strength.

The present invention may be better understood by reference to the following examples that are intended for the purpose of illustration and are not to be construed as in any way limiting the scope of the present invention, which is defined in the claims appended hereto. In the following examples, all parts and percentage are by weight unless otherwise indicated.

EXAMPLES (A) Polycarbonate Resin

Bisphenol-A based polycarbonate with a weight average molecular weight ($M_w$) of about 25,000 was used.

(B) Rubber Modified Vinyl-Grafted Copolymer ($b_1$) 58 parts of butadiene rubber latex, 31 parts of styrene, 11 parts of acrylonitrile, and 150 parts of deionized water were mixed. To the mixture, 1.0 parts of potassium oleate, 0.4 parts of cumenhydroperoxide, and 0.3 parts of t-dodecyl mercaptane chain transfer agent were added. The mixture was kept at 75° C. for 5 hours to obtain ABS latex. To the ABS latex, 1% sulfuric acid was added, coagulated and dried to obtain styrene-containing graft copolymer resin (g-ABS) in powder form.

(b2) A graft copolymer of EXL-2602 (product name) by Kureha Co. was used, in which methacrylic acid methyl ester monomers are grafted onto butadiene rubber.

(C) Vinyl Copolymer 71 parts of styrene, 29 parts of acrylonitrile, 120 parts of deionized water and 0.17 parts of azobisisobutylonitrile (AIBN) were mixed. To the blend, 0.5 parts of tricalciumphosphate and 0.4 parts of t-dodecyl mercaptan chain transfer agent were added. The resultant solution was suspension polymerized at 75° C. for 5 hours. The resultant was washed, dehydrated and dried. Styrene-acrylonitrile copolymer (SAN) in powder state was used.

(D) Organic Phosphorous Compound ($d_1$) Cyclic Oligomeric Phosphazene Compound

The cyclic phosphazene oligomer was used as a mixture of: 66.5% by weight of an oligomer of Formula (II) in which $R_1$ is phenoxy, k and m are 1 or 2, and l is 0; 20.3% by weight of an oligomer of Formula (II) in which $R_1$ is phenoxy, $R_2$ is a derivative from resorcinol, k and m are 1 or 2, and l is 1; 4.9% by weight of an oligomer of Formula (II) in which $R_1$ is phenoxy, $R_2$ is a derivative from resorcinol, k and m are 1 or 2, and l is 2 or more; and 8.3% by weight of an oligomer of Formula (II) in which $R_1$ is phenoxy, $R_2$ is a derivative from resorcinol, k and m are 1 or 2, and l is 3 or more.

($d_2$) Oligomeric Phosphorous Acid Ester

The oligomeric phosphorous acid ester was used as a mixture of: 1.2% by weight of an oligomer of Formula (IV) in which n is 0, 89.1% by weight of an oligomer of Formula (IV) in which n is 1, and 9.7% by weight of an oligomer of Formula (IV) in which n is 2 or more. It was used a biphenyl derivative oligomeric phosphorous acid ester compound that had average n is 1.05, $R_3$, R4, $R_5$ and R6 are phenyl group respectively.

(E) Fluorinated Polyolefin Resin

Teflon (registered trademark) 7AJ by Dupont company was used.

Examples 1~4

The components as shown in Table 1, an antioxidant and a heat stabilizer were added in a conventional mixer and the mixture was extruded through a twin screw extruder with L/D=35 and Φ=45 mm to prepare a product in pellet form. The resin pellets were molded into test specimens for measuring flame retardancy and other properties using a 10 oz injection molding machine at 250° C.

Comparative Examples 1~7

Comparative Examples 1 and 2 were conducted in the same manner as in Example 1 except that an organic phosphorous compound with the composition out of the claimed range was used.

Comparative Example 3 was conducted in the same manner as in Example 1 except that only a cyclic phosphazene compound was used as a flame retardant.

Comparative Example 4 was conducted in the same manner as in Example 1 except that only an oligomeric phosphoric acid ester was used as a flame retardant.

Comparative Example 5 was conducted in the same manner as in Example 4 except that an organic phosphorous compound with the composition out of the claimed range was used.

Comparative Example 6 was conducted in the same manner as in Example 4 except that only a cyclic phosphazene compound was used as a flame retardant.

Comparative Example 7 was conducted in the same manner as in Example 4 except that only an oligomeric phosphoric acid ester was used as a flame retardant.

TABLE 1

| | | Examples | | | | Comparative Examples | | | | | | |
|---|---|---|---|---|---|---|---|---|---|---|---|---|
| | | 1 | 2 | 3 | 4 | 1 | 2 | 3 | 4 | 5 | 6 | 7 |
| (A) Polycarbonate Resin | | 75 | 75 | 75 | 95 | 75 | 75 | 75 | 75 | 95 | 95 | 95 |
| (B) Rubber Modified Vinyl-Grafted Copolymer | ($b_1$) | 11 | 11 | 11 | — | 11 | 11 | 11 | 11 | — | — | — |
| | ($b_2$) | — | — | — | 5 | — | — | — | — | 5 | 5 | 5 |
| (C) Vinyl Copolymer | | 14 | 14 | 14 | — | 14 | 14 | 14 | 14 | — | — | — |
| (D) Organic Phosphorous Compound | ($d_1$) | 2 | 4 | 6 | 1 | 10 | 12 | 14 | — | 3 | 4 | — |
| | ($d_3$) | 12 | 10 | 8 | 3 | 4 | 2 | — | 14 | 1 | — | 4 |
| (E) Fluorinated Polyolefin Resin | | 0.5 | 0.5 | 0.5 | 0.4 | 0.5 | 0.5 | 0.5 | 0.5 | 0.4 | 0.4 | 0.4 |

The specimens prepared in the Examples 1~4 and the Comparative Examples 1~7 were kept at the relative humidity of 50% at 23° C. for 24 hours. The physical properties of the test specimens were measured in accordance with ASTM regulations.

The flame retardancy was measured in accordance with UL94. The test specimens have a thickness of 1.6 mm. The total flame out time is the sum of the first flame out time and the second flame out time when five specimens were tested twice. The Vicat softening temperature (VST) of the specimens were measured in accordance with ASTM D1525. The test results were shown in Table 2 below.

TABLE 2

|  | Examples | | | | Comparative Examples | | | | | | |
| --- | --- | --- | --- | --- | --- | --- | --- | --- | --- | --- | --- |
|  | 1 | 2 | 3 | 4 | 1 | 2 | 3 | 4 | 5 | 6 | 7 |
| UL 94 (1/16") | V-0 | V-0 | V-0 | V-0 | V-1 | V-1 | V-1 | V-1 | V-1 | V-1 | V-1 |
| Total Flame Out Time (sec) | 39 | 29 | 41 | 23 | 111 | 87 | 62 | 54 | 63 | 86 | 74 |
| VST(° C.) | 104 | 105 | 105 | 131 | 106 | 107 | 108 | 103 | 132 | 132 | 130 |

As shown in Table 2, the resin compositions according to the present invention employing a phosphorous mixture of cyclic phosphazene oligomer and oligomeric phosphoric acid ester show synergistic effect in flame retardancy and maintaining good heat resistance, compared to those employing a single phosphorous compound or being deviated from claimed range.

The present invention has remarkable characteristics such as a good balance of physical properties such as flame retardancy, impact strength, heat resistance, thermal stability, processability and appearance by using an oligomer type cyclic phosphazene compound and an oligomeric phosphoric acid ester as a flame retardant.

The present invention can be easily carried out by an ordinary skilled person in the art. Many modifications and changes may be deemed to be with the scope of the present invention as defined in the following claims.

What is claimed is:

1. A flame retardant thermoplastic resin composition comprising:

(A) 45 to 95 parts by weight of a polycarbonate resin;

(B) 1 to 50 parts by weight of a rubber modified vinyl-grafted copolymer prepared by graft-polymerizing ($b_1$) 5 to 95% by weight of a monomer mixture of 50 to 95% by weight of at least one of styrene, α-methylstyrene, halogen- or alkyl-substituted styrene, $C_{1-8}$ methacrylic acid alkyl ester, $C_{1-8}$ acrylic acid alkyl ester, or a mixture thereof and 5 to 50% by weight of acrylonitrile, methacrylonitrile, $C_{1-8}$ methacrylic acid alkyl ester, $C_{1-8}$ acrylic acid alkyl ester, maleic acid anhydride, or $C_{1-4}$ alkyl- or phenyl N-substituted maleimide onto ($b_2$) 5 to 95% by weight of a rubber polymer selected from the group consisting of butadiene rubber, acryl rubber, ethylene-propylene rubber, styrene-butadiene rubber, acrylonitrile-butadiene rubber, isoprene rubber, copolymer of ethylene-propylene-diene (EPDM), polyorganosiloxane-polyalkyl (meta)acrylate rubber complex and a mixture thereof;

(C) 0 to 50 parts by weight of a vinyl copolymer prepared from ($c_1$) 40 to 95% by weight of at least one of styrene, α-methyl styrene, halogen or alkyl substituted styrene, $C_{1-8}$ methacrylic acid alkyl ester, or $C_{1-8}$ acrylic acid alkyl ester and ($c_2$) 5 to 60% by weight of at least one of acrylonitrile, methacrylonitrile, $C_{1-8}$ methacrylic acid alkyl ester, $C_{1-8}$ acrylic acid alkyl ester, maleic acid anhydride, or $C_{1-4}$ alkyl or phenyl N-substituted maleimide;

(D) 1~30 parts by weight of a mixture of organic phosphorous compounds ($d_1$) 1~50% by weight of a cyclic oligomeric phosphazene compound represented by the following Formula (II) and ($d_2$) 99~50% by weight of an oligomeric phosphoric acid ester compound represented by the following Formula (IV), per 100 parts by weight of the sum of (A), (B) and (C): and

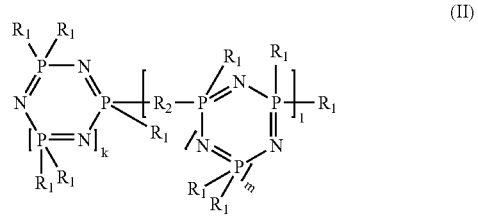

(II)

wherein $R_1$ is alkyl, aryl, alkyl substituted aryl, aralkyl, alkoxy, aryloxy, amino, or hydroxyl or alkoxy substituted with alkyl, aryl, amino, or hydroxy group or aryloxy substituted with alkyl, aryl, amino, or hydroxy group; k and m are an integer from 0 to 10; $R_2$ is $C_{6-30}$ dioxyaryl or alkyl substituted $C_{6-30}$ dioxyaryl derivative; and l is a degree of polymerization and the average value of l is from 0.3 to 3;

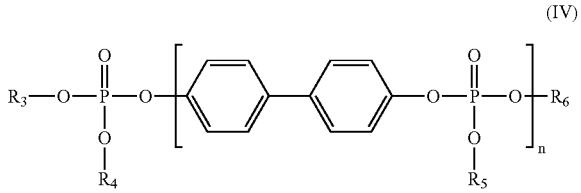

(IV)

wherein $R_3$, $R_4$, $R_5$ and $R_6$ are independently a $C_{6-20}$ aryl group or an alkyl-substituted $C_{6-20}$ aryl group, respectively, and n is an integer from 1 to 5 representing the number of repeating units and the average value of n in the oligomeric phosphoric acid ester is 1 to 3;

(E) 0.05 to 5.0 parts by weight of a fluorinated polyolefin resin per 100 parts by weight of (A)+(B)+(C).

2. The flame retardant thermoplastic resin composition as defined in claim 1, wherein said cyclic oligomeric phosphazene compound has a linear structure.

3. The flame retardant thermoplastic resin composition as defined in claim 1, wherein $R_1$ is phenoxy and $R_2$ is a derivative from catechol, resorcinol, hydroquinone, or the bisphenylenediol represented by the following Formula (III):

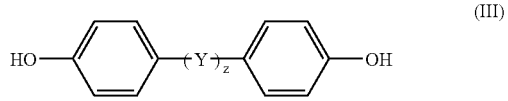

(III)

wherein Y is alkylene of $C_{1-5}$, alkylidene of $C_{1-5}$ cycloalkylidene of $C_{5-6}$, S or $SO_2$, and z is 0 or 1.

4. The flame retardant thermoplastic resin composition as defined in claim 1, wherein said $R_3$, $R_4$, $R_5$ and $R_6$ are phenyl, or naphthyl groups.

5. The flame retardant thermoplastic resin composition as defined in claim 1, wherein said cyclic oligomeric phosphazene compound has a structure with a branched chain at the main chain.

6. The flame retardant thermoplastic resin composition as defined in claim 1, wherein said $R_3$, $R_4$, $R_5$ and $R_6$ are a respectively alkyl-substituted phenyl in which alkyl is methyl, ethyl, isopropyl, or t-butyl.

7. The flame retardant thermoplastic resin composition as defined in claim 1, wherein said fluorinated polyolefin resin has an average particle size of 0.05 to 1,000 μm and a density of 1.2 to 2.3 g/cm³.

* * * * *